(12) United States Patent
Foss

(10) Patent No.: US 7,841,125 B2
(45) Date of Patent: Nov. 30, 2010

(54) ICE FISHING TRIGGERED SUPPORT

(76) Inventor: Daniel V. Foss, 14706 Dominica Ct., Apple Valley, MN (US) 55124

( * ) Notice: Subject to any disclaimer, the term of this patent is extended or adjusted under 35 U.S.C. 154(b) by 118 days.

(21) Appl. No.: 12/079,763

(22) Filed: Mar. 28, 2008

(65) Prior Publication Data
US 2009/0241406 A1  Oct. 1, 2009

(51) Int. Cl.
*A01K 97/10* (2006.01)
*A01K 97/12* (2006.01)

(52) U.S. Cl. .......................... 43/21.2; 43/15

(58) Field of Classification Search ........... 43/21.2, 43/15, 17, 16; 248/514, 530, 538; *A01K 97/10, A01K 97/12*
See application file for complete search history.

(56) References Cited

U.S. PATENT DOCUMENTS

| 420,592 | A | * | 2/1890 | Dayton ................. 248/514 |
| 2,494,800 | A | * | 1/1950 | Finley ..................... 43/15 |
| 2,642,690 | A | * | 6/1953 | Soenksen ................. 43/15 |
| 2,803,911 | A | * | 8/1957 | Hollingsworth ............ 43/15 |
| 2,869,814 | A | * | 1/1959 | Hurlimann ............... 248/538 |
| 2,917,257 | A | * | 12/1959 | Hinchliffe ............... 248/514 |
| 3,037,314 | A | * | 6/1962 | Hardy ..................... 43/17 |
| D222,964 | S | * | 2/1972 | Woodbury ............... D22/147 |
| 3,897,646 | A | * | 8/1975 | Sheets .................... 43/15 |
| 4,471,553 | A | * | 9/1984 | Copeland ................. 43/15 |
| 4,676,018 | A | * | 6/1987 | Kimball .................. 43/15 |
| 4,677,783 | A | * | 7/1987 | Cratsa ................... 43/15 |
| 5,557,876 | A |   | 9/1996 | Parker ................... 43/21.2 |
| 5,937,567 | A | * | 8/1999 | Elkins ................... 43/21.2 |
| 6,185,855 | B1 |  | 2/2001 | Sizer et al. ............. 43/21.2 |
| 6,427,376 | B1 |  | 8/2002 | Weber ................... 43/21.2 |
| 6,453,598 | B1 |  | 9/2002 | Robertson ............... 43/21.2 |
| 6,622,421 | B1 |  | 9/2003 | Daniels ................... 43/4.5 |
| 7,213,361 | B1 |  | 5/2007 | Perigo, Sr. .............. 43/21.2 |
| 7,213,362 | B1 |  | 5/2007 | Weber et al. ............ 43/21.2 |
| 7,272,909 | B2 |  | 9/2007 | Weber et al. ............ 43/21.2 |
| 7,320,196 | B2 |  | 1/2008 | Diederichs .............. 43/21.2 |
| 2007/0011934 | A1 |  | 1/2007 | Rayfield .................. 43/17 |

* cited by examiner

*Primary Examiner*—Son T Nguyen
*Assistant Examiner*—Shadi Baniani
(74) *Attorney, Agent, or Firm*—Mark A. Litman & Associates, P.A.

(57) ABSTRACT

A system for ice fishing has a base with a support surface, an arm extending up from the support surface and an upper end of the arm pivotally connected at a pivot point to a fishing pole support. The fishing pole support has a grip support back end having a fishing line brace rearward of the pivot point and pole support front end forward of the pivot point so that a fishing line passing from the pole support front end over the fishing line brace passes in a downward direction. When tension is applied to the downward fishing line, pivoting pressure is provided to the grip support back end at the line brace, elevating the pole support front end by rotation of the fishing pole support.

13 Claims, 1 Drawing Sheet

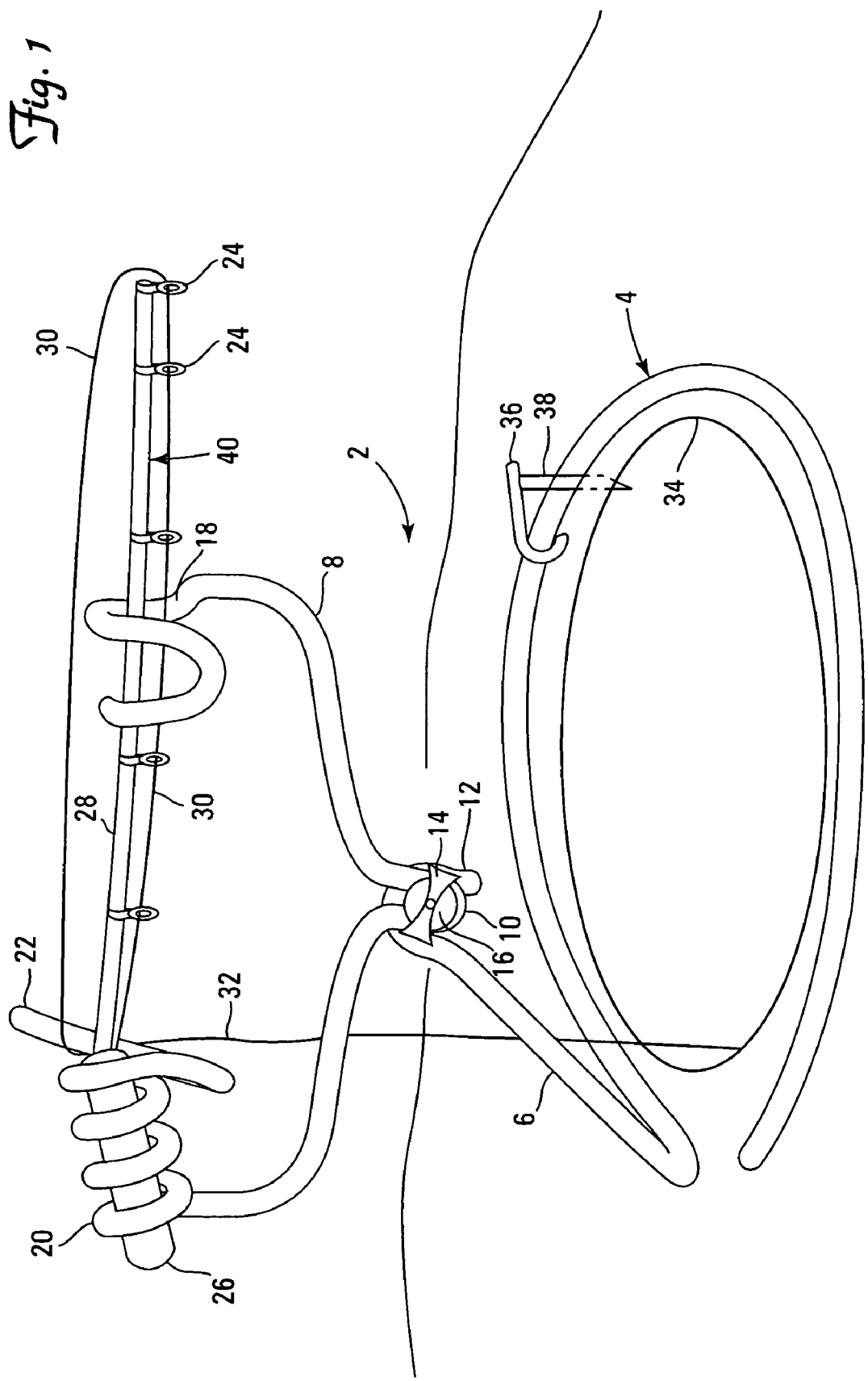

ICE FISHING TRIGGERED SUPPORT

BACKGROUND OF THE INVENTION

1. Field of the Invention

The present invention relates to fishing, particularly ice fishing and supports for ice fishing poles.

2. Background of the Art

Ice fishing is a very popular pastime in many Northern locals. Sportsmen drill a hole into thick ice surfaces over lakes, bring an enclosure to protect against extreme weather, and watch over their line dropped through the opening. It is a very social sport. One problem is that because of the need to constantly watch over the line, even during the usual cold weather associated with the sport. Many different types of devise have been used to simplify the sport, especially when signaling a catch. These are often referred to as tip-up systems on the ice fishing poles.

U.S. Pat. No. 7,320,106 describes a tubular fishing rod holder capable of being used from a portable ice fishing shelter, a bucket, a boat, or a lawn chair. The fishing rod holder having a rearward mounting end, and a forward holding end, wherein the holding end is of sufficient length and diameter to accommodate the handle portion of, for example, ice fishing, spinning, and jigging rods. The rearward mounting end portion comprises upper and lower mounting slots, communicating the rearward end with upper and lower apertures, which a portion of the upper and lower apertures are shaped to form upper and lower locking grooves, allowing the fishing rod holder to be removably mounted to a bucket, and a vertical or angled support in a cantilevered arrangement, positioning a fishing rod within easy reach of a fisherman.

U.S. Pat. Nos. 6,427,376, 7,272,909 and 7,213,362 (Weber) describes a support stand assembly for a rod and reel combination comprises a horizontal base member with a vertical support member extending from the base member. A linear support arm member is pivotally secured at a first end to the vertical support member, with the support arm member extending horizontally in a support position and pivoting upwardly to a release position. A stop member is secured adjacent a second end of the support arm member with a portion of the arm member extending beyond the stop member. An attachment member is adapted for securement to the rod of a rod and reel combination. The attachment member engages with the portion of the arm member extending beyond the stop member to support the rod and reel combination. In use, the attachment member is secured at the balance point of the rod and reel combination and engaged with the portion of the arm member extending beyond the stop member to support the rod and reel combination in a horizontal position. The support arm member disengages from the attachment member upon pivoting of the support arm member to the release position by upward movement of the rod and reel combination.

U.S. Patent Application No. 20070011934 (Rayfield) describes a fishing system with audio and visual signals is capable of use with both tip ups and tip downs. The fishing system includes a tower like tubular support extending from a base member configured to receive at least on tip down. The tubular support includes a tubular visual signal housed at a location on the support and an audio signal housed within the support. The tubular support includes a first wiring outlet configured for wiring a switch on the tip downs to the audio and visual signals and a second wiring outlet for wiring a switch on the tip ups to the audio and visual signals.

U.S. Pat. No. 7,213,362 (Perigo) describes a support stand for a fishing pole holder, and is particularly adapted for ice fishing. In use, the stand holds the fishing pole in a generally upward angled position. The fishing pole is held in a pivotal position, so that upon sensing a hit on the attached line, the fishing pole tips downward. Legs, for supporting the body of the stand, can be placed in a first position or a second position, depending on the conditions of use for the stand. When not in use, the legs of the stand can be stored within the body.

U.S. Pat. No. 6,543,598 (Robertson) describes an adjustable fishing rod stand or holder or fishing rod/fishing rod holder combination. The holder is preferably comprises an elongated base, and elongated arm, and a cradle. The elongated arm preferably has a first end and a second end with the first end being attached to the base, and the arm extending traversely from and being rotatable extendable relative to the base. The cradle is for receiving and supporting the fishing rod in a holding position. The cradle should be pivotally attached to the second end of the elongated arm, allowing the fishing rod holder to support the fishing rod in variable, inclined upright positions suitable for fishing. The fishing rod/fishing rod holder of the present invention may be used to support a fishing rod on any surface, and optionally remains attached to the rod when the user transports the rod or casts the fishing line.

U.S. Pat. No. 6,185,855 describes a fishing rod and reel holder having a one piece wire frame elevates and holds a fishing rod in an angular position relative to the frozen surface of a body of water. The holder has a generally flat base member and an angularly disposed helical body adapted to support the rod adjacent a hole in the frozen surface. The fishing rod is turned to position the shank of the fishing reel between coils of the helical body thereby releasably secure the rod to the holder.

SUMMARY OF THE INVENTION

A system for ice fishing has a base with a support surface, an arm extending up from the support surface and an upper end of the arm pivotally connected at a pivot point to a fishing pole support. The fishing pole support has a grip support back end having a fishing line brace rearward of the pivot point and pole support front end forward of the pivot point. A fishing line passing from the pole support front end over the fishing line brace passes in a downward direction, and when tension is applied to the downward fishing line, pivoting pressure is provided to the grip support back end at the line brace, elevating the pole support front end by rotation of the fishing pole support.

BRIEF DESCRIPTION OF THE FIGURES

FIG. 1 is a perspective view of an ice fishing rod and triggered support system for use with the rod.

DETAILED DESCRIPTION OF THE INVENTION

An ice fishing support system comprises a base that provides stable support for the system around a hole in the ice. The holes are normally between 4 and 14 inches in diameter. The base circumscribes at least half of the hole and preferably more than 75% of the hole, up to 100% of the hole. The base lies flat on the ice and through an upwardly directed arm, supports a rotating pole supporting system. The pole supporting system engages and restricts movement of an ice fishing pole handle at one end (the back end). The pole supporting system supports the rod itself at the other end (the front end) of the supporting system. A fishing line extends from the front end of the pole and turns back towards a line brace that can provide a rotating force or torque that can swivel the front end of the pole up when the line is pulled down across the line brace. The pole support system should be attached to the upwardly directed arm through a rotation connection. Reference to FIG. 1 will assist in a further understanding of the technology described herein.

FIG. 1 shows an ice fishing rod support system 2 having a base 4 that circumscribes a hole 34 in the ice. The base 4 is shown as a solid, single piece, such as metal, coated metal, plastic, wood or the like. Not shown inn the FIGURE is an optional additional support such as a frame or cover that can add additional stability to the base. The base 4 continues as an upwardly directed arm 6 that forms a hook 12 that is secured by a knob 14, washer 16 to a bottom hook or loop section 10 that forms a support attachment for the pole support element 8. The pole support system 8 has a grip support element 20 that secures the pole grip 26 and prevents it from sliding out of the support 8. The pole itself 40 extends across and is supported by a front end pole support 18. The fishing line 30, extends through line support loops 24 and then returns towards the handle or grip 26 and then crosses over a line brace 22 adjacent the grip support element 20. By having the crossover position or looping position of the line 30 over the line brace 22 and then downward through the hole 34, a levering or torque action is placed on the rear end 20 of the pole support 8. This leverage pulls the rear portion 20 downward when the line 30 is pulled downward, lifting the front end pole support 18. This is in contrast to the normal action of a catch (a fish pulling on a line) where the front end of a pole would be pulled down.

Tension in the rotation of the pole support element 8 about the knob or wing screw 14 acting as a fulcrum or pivot point for rotation of the support element 8 by tightening or loosening of the knob 14. As the circumference and diameter of the base 4 exceeds the circumference and diameter of the hole 34, the base 4 will not slip through the hole 34, even with a strong pull on the line 30 and some compressibility or flexibility in the material of the base 4. Although the base 4 cannot be pulled into and through the hole 34, the base 4 may also be secured to the ice with a device comprising a base dripping element 36 and an ice gripping element 38.

Alternative descriptions for technology described herein include the following. A system for ice fishing has a base with a support surface, the support surface being in contact with the ice when used or on a non-slip pad. There is an arm extending up from the support surface. An upper end of the arm is pivotally connected at a pivot point to a fishing pole support. The fishing pole support has a grip support back end having a fishing line brace rearward of the pivot point and a pole support front end forward of the pivot point. The respective elements are distributed so that a fishing line passing from the pole support front end over the fishing line brace passes is a downward direction, and when tension is applied to the downward fishing line, pivoting pressure is provided to the grip support back end at the line brace, elevating the pole support front end by rotation of the fishing pole support. The base with a support surface comprises an arcuate base, such as an oval or circular base, although a square or rectangular base may be used. A tension adjustment system is positioned at the pivot point. The line brace has a horizontal component that is in contact with a fishing line, such as a horizontal bar, a loop (where an internal diameter of the loop forms the horizontal surface), a hook, or a sloped surface (an angled bar). The grip support back end comprises a helix having an opening sufficient to accept a fishing pole grip and a fishing pole grip is present within the opening of the helix. The pole support front end comprises a helix having an opening sufficient to accept a fishing pole. The pole support front end comprises a helix having an opening sufficient to accept a fishing pole and a central axis of the front end helix and a central axis of the grip end helix are coincident, that is, the axis of one is the same as the axis of the other. The tension adjustment system is preferably positioned at the pivot point. The tension adjustment system may be an engaged screw element.

The support system has a number of optional features that can be built into the performance capabilities of the system. For example, the circular base may be collapsible, as may the entire system, especially at any natural angles or connections between sections. In this way, the system may be collapsed for ease of transport. The circular base may telescope or fold or extend to adapt to ice holes of different sizes. The cradles for the handles of the poles may be adjustable, or expandable to accept pole handles of different sizes. The cradles may be replaceable or exchangeable for different size holes. The system may also be carried and attached to boats, canoes and the like. The system may also be provided with otherwise standard Tip Up functions. The system of claim may have the pole support is detachably attached to the system so that helices of different dimensions may be attached to the system, one-at-a-time. The system may have a securing element provided on the base to assist stabilizing the system against excessive movement.

Although specific examples, dimensions and materials have been described, these are intended to be non-limiting examples enabling a disclosure of a generic scope of technology.

What is claimed:

1. A system for ice fishing comprising a base with a support surface, an arm extending up from the support surface, an upper end of the arm pivotally connected at a pivot point to a fishing pole support, the fishing pole support having a grip support back end having a fishing line brace rearward of the pivot point and pole support front end forward of the pivot point so that a fishing line passing from the pole support front end over the fishing line brace passes in a downward direction, and when tension is applied to the downward fishing line, pivoting pressure is provided to the grip support back end at the line brace, elevating the pole support front end by rotation of the fishing pole support.

2. The system of claim 1 wherein the base with the support surface comprises an arcuate base.

3. The system of claim 1 wherein a tension adjustment system is positioned at the pivot point.

4. The system of claim 1 wherein the line brace has a horizontal component that is in contact with a fishing line.

5. The system of claim 1 wherein the grip support back end comprises a helix having an opening sufficient to accept a fishing pole grip.

6. The system of claim 5 wherein a fishing pole grip is present within the opening of the helix.

7. The system of claim 5 wherein the pole support front end comprises a helix having an opening sufficient to accept a fishing pole and a central axis of the front end helix and a central axis of the grip end helix are coincident.

8. The system of claim 7 wherein the fishing pole support is detachably attached to the system so that helices of different dimensions may be attached to the system, one-at-a-time.

9. The system of claim 5 wherein a tension adjustment system is positioned at the pivot point.

10. The system of claim 9 wherein the tension adjustment system comprises an engaged screw element.

11. The system of claim 1 wherein the pole support front end comprises a helix having an opening sufficient to accept a fishing pole.

12. The system of claim 1 wherein individual components may be collapsed for ease of storage of a collapsed system.

13. The system of claim 1 wherein a securing element is provided on the base to assist stabilizing the system against excessive movement.

* * * * *